(12) United States Patent
Daoud et al.

(10) Patent No.: US 11,886,811 B2
(45) Date of Patent: *Jan. 30, 2024

(54) SYSTEMS AND METHODS FOR UPDATING A MOBILE APPLICATION

(71) Applicant: CrowdComfort, Inc., Boston, MA (US)

(72) Inventors: Abdullah Daoud, Lynnfield, MA (US); B. Eric Graham, Wenham, MA (US); Chris Fuentes, Plaistow, NH (US)

(73) Assignee: CrowdComfort, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/117,353

(22) Filed: Mar. 3, 2023

(65) Prior Publication Data

US 2023/0205986 A1 Jun. 29, 2023

Related U.S. Application Data

(63) Continuation of application No. 17/856,490, filed on Jul. 1, 2022, now Pat. No. 11,625,530, which is a continuation of application No. 17/011,608, filed on Sep. 3, 2020, now Pat. No. 11,379,658, which is a continuation of application No. 15/204,970, filed on
(Continued)

(51) Int. Cl.
| | |
|---|---|
| G06F 40/197 | (2020.01) |
| H04L 67/02 | (2022.01) |
| G05B 15/02 | (2006.01) |
| H04W 4/50 | (2018.01) |
| H04W 4/80 | (2018.01) |

(Continued)

(52) U.S. Cl.
CPC .......... *G06F 40/197* (2020.01); *G05B 15/02* (2013.01); *G06F 40/154* (2020.01); *H04L 67/01* (2022.05); *H04L 67/02* (2013.01); *H04W 4/50* (2018.02); *H04W 4/80* (2018.02)

(58) Field of Classification Search
CPC ... G05B 15/02; G06F 17/227; G06F 17/2288; H04L 67/02; H04L 67/42; H04W 4/20; H04W 4/001; H04W 4/008; H04W 4/50; H04W 4/80

See application file for complete search history.

(56) References Cited

U.S. PATENT DOCUMENTS

| | | | |
|---|---|---|---|
| 10,248,403 B2 * | 4/2019 | Gross | .................. H04L 67/02 |
| 2009/0138965 A1 * | 5/2009 | Ferlitsch | .............. H04N 1/4433 726/21 |

(Continued)

*Primary Examiner* — Zhipeng Wang
(74) *Attorney, Agent, or Firm* — Nutter McClennen & Fish LLP

(57) ABSTRACT

The present invention provides systems and methods for providing cross-device native functionality for a native app. More specifically, the invention is directed to a JavaScript Object Notation (JSON) data exchange format for use with a native app running on a user's mobile device, wherein the exchange format is configured to improve user experience and interaction with the app. The present invention may be particularly useful in a mobile-based crowdsourcing platform in which data is continually exchanged between remote user devices and a cloud-based service for collecting and managing user-driven data based on user interaction with native apps on their devices.

19 Claims, 9 Drawing Sheets

Related U.S. Application Data

Jul. 7, 2016, now Pat. No. 10,796,085, which is a continuation-in-part of application No. 14/328,492, filed on Jul. 10, 2014, now Pat. No. 9,625,922.

(60) Provisional application No. 62/189,446, filed on Jul. 7, 2015, provisional application No. 62/189,451, filed on Jul. 7, 2015, provisional application No. 62/189,448, filed on Jul. 7, 2015, provisional application No. 61/903,123, filed on Nov. 12, 2013, provisional application No. 61/844,494, filed on Jul. 10, 2013.

(51) Int. Cl.
*G06F 40/154* (2020.01)
*H04L 67/01* (2022.01)

(56) References Cited

U.S. PATENT DOCUMENTS

| | | | |
|---|---|---|---|
| 2010/0289643 A1* | 11/2010 | Trundle | F24F 11/47 340/3.1 |
| 2012/0233538 A1* | 9/2012 | Negoro | H04N 1/00222 715/234 |
| 2013/0263160 A1* | 10/2013 | Sandholm | G06F 9/541 719/330 |
| 2014/0281490 A1* | 9/2014 | Prakash | H04W 12/35 455/411 |
| 2014/0286644 A1* | 9/2014 | Oshima | H04B 10/11 398/118 |
| 2016/0164993 A1* | 6/2016 | Aizenberg | H04L 67/51 709/203 |
| 2016/0266889 A1* | 9/2016 | Gross | H04L 67/34 |
| 2019/0163453 A1* | 5/2019 | Seksenov | G06F 8/40 |

\* cited by examiner

SYSTEMS AND METHODS FOR UPDATING A MOBILE APPLICATION

CROSS REFERENCE TO RELATED APPLICATIONS

This application is a continuation of U.S. patent application Ser. No. 17/856,490, filed Jul. 1, 2022, which is a continuation of U.S. patent application Ser. No. 17/011,608, filed Sep. 3, 2020 (U.S. Pat. No. 11,379,658 issued Jul. 5, 2022), which is a continuation of U.S. patent application Ser. No. 15/204,970, filed Jul. 7, 2016 (now U.S. Pat. No. 10,796,085 issued Oct. 6, 2020), which (A) is a continuation-in-part of U.S. patent application Ser. No. 14/328,492, filed Jul. 10, 2014 (now U.S. Pat. No. 9,625,922 issued Apr. 18, 2017), which claims the benefit of U.S. Provisional Application No. 61/903,123, filed Nov. 12, 2013, and U.S. Provisional Application No. 61/844,494, filed Jul. 10, 2013; and (B) claims the benefit of U.S. Provisional Application No. 62/189,446, filed Jul. 7, 2015, and U.S. Provisional Application No. 62/189,448, filed Jul. 7, 2015, and U.S. Provisional Application No. 62/189,451, filed Jul. 7, 2015.

The contents of each of the related applications previously noted are incorporated by reference herein in their entireties.

FIELD OF THE INVENTION

The present disclosure relates generally to management systems and methods, and, more particularly, to a system for providing a mobile-based crowdsourcing platform configured to provide an intuitive and semi-automated means of collecting and managing user-driven data.

BACKGROUND

Mobile applications, also known as "apps", offer application programming interfaces (APIs) for accessing, for example, internet services, device sensors for a device on which an application is installed, user interface (UI) components, and the like. The applications can be pre-installed on mobile devices during manufacture, downloaded by customers from various mobile software distribution platforms, or include web applications delivered over Hypertext Transfer Protocol (HTTP), for example. Due to differences in device platforms, applications may be written or deployed in native application code that is specific to a particular platform. A native application (referred to herein as "native app") is an application program that has been developed for use on a particular platform or device. Because native apps are written for a specific platform, they can interact with and take advantage of operating system features and other software that is typically installed on that platform. Furthermore, a native app has the ability to use device-specific hardware and software, meaning that native apps can take advantage of the latest technology available on mobile devices, such as a global positioning system (GPS), camera, or other sensor components. This can be construed as an advantage for native apps over Web apps or mobile cloud apps.

In order to realize any periodic modifications in applications, the applications need to be updated for each modification. However, this aspect has been known to limit the speed of development and deployment of new applications across different platforms. More specifically, in today's current app-centric environment, there are a number of challenges facing companies to deploy apps or updates to their existing apps. Some of the challenges include updating user interface (UI) elements mandates. For example, developers may need to push updates to a user's device, which generally results in disruption to the user (e.g., requires user to install update and interrupt regular use of their device) and further requires users to constantly download new updates as they occur. Some developers utilize hybrid apps. A hybrid app is one that combines elements of both native and Web applications. However, hybrid apps are not entirely user friend and rely on internet connectivity, which can be limiting.

Other challenges include cross-platform native capability (e.g., ability of software to be run on more than one platform with little or no special preparation). The term platform can refer to the type of processor and/or other hardware on which a given operating system or application runs, the type of operating system on a computer, or the combination of the type of hardware and the type of operating system running on it. In the context of mobile devices (e.g., smartphones), an application may need to be written in a particular format to match the platform of any given device (e.g., iOS, Android, Windows, etc.).

In order to address cross-platform issues, some companies have relied on common language compilers that compile a piece of code into native form. However, any updates to the app still require a push, and thus result in the drawbacks previously described. Some companies may utilize a hybrid app for providing cross-platform capability. The use of a hybrid app generally involves the use of a wrapper, such as PHONE GAP. A wrapper is essentially a mobile development framework for allowing programmers to build apps using programming languages, such as JavaScript, HTML, CSS, instead of relying on a platform-specific APIs such as those in iOS, Android, or Windows. The resulting applications are hybrid, meaning that they are neither truly native mobile application (because all layout rendering is done via web views instead of the platform's native UI framework) nor purely web-based (because they are not just web apps, but are packaged as apps for distribution and have access to native device APIs). A drawback of using hybrid apps is that they do not provide a robust offline capability and further provide a subpar user experience.

SUMMARY

The present invention provides systems and methods for providing cross-device native functionality for a native app. More specifically, the invention is directed to a JavaScript Object Notation (JSON) data exchange format for use with a native app running on a user's mobile device, wherein the exchange format is configured to improve user experience and interaction with the app. The present invention may be particularly useful in a mobile-based crowdsourcing platform in which data is continually exchanged between remote user devices and a cloud-based service for collecting and managing user-driven data based on user interaction with native apps on their devices. However, it should be noted that the present invention is not limited to use in a crowdsourcing platform scenario, and may be implemented in mobile applications (apps) in general and not directed to crowdsourcing. For example, the JSON data exchange format may be implemented in a native app directed to providing surveys to a user, or to provide a user with a view and/or control over sensor data in a building, or generating a module available upon demand for entering the cost of a particular work order on the fly. The uses of the JSON data exchange format of the present invention are limitless.

The present invention generally provides a system including a plurality of remote mobile devices configured to communicate and exchange data with a cloud-based service, such as a crowdsourcing platform. Each of the plurality of mobile devices is generally running an abstracted native app for allowing a user to interact and share data with the cloud-based service. The abstracted native app generally includes an app shell, native basic UI elements, and a JSON Translator embedded within the app configured to dynamically and, in real time (when connected to the cloud-based service), translate objects received from the cloud-based service to native UI elements. Accordingly, the JSON Translator acts as a translation layer allowing the dynamic interpretation of data (e.g., app updates) received from cloud-based service into native UI elements compatible with the native app running on the device. Thus, the data exchange format of the present invention allows streaming of UI changes, in contrast to requiring a developer to specifically write the language into a compatible format in each instance of an update. The cloud-based service includes components configured to allow the distribution of the objects to the mobile devices and further allows administrators to make changes or modifications to the app. The system allows an administrator (e.g., customer or client providing service) to make changes or modifications to an app in a mobile device's native form on the fly without requiring a re-download or an update of the app.

The present invention provides numerous advantages over current systems. In particular, the novel data exchange format allows for the control of user experience and the UI elements without forcing app updates, essentially allowing an administrator or app owner/developer to control what the user can and cannot do on the app. Furthermore, the mobile app is in native form, which provides optimal user experience, as a user need only download and install the native app once and any updates are seamlessly transmitted thereto without requiring re-download or additional installs. The present invention further simplifies the development process for light weight native apps, which will significantly reduce time for entry to market. The present invention further improves host of capabilities, such as automated workflow and automated UI interaction, as well as potentially expanding the localization capabilities.

BRIEF DESCRIPTION OF THE DRAWINGS

Features and advantages of the claimed subject matter will be apparent from the following detailed description of embodiments consistent therewith, which description should be considered with reference to the accompanying drawings.

Figure 1:
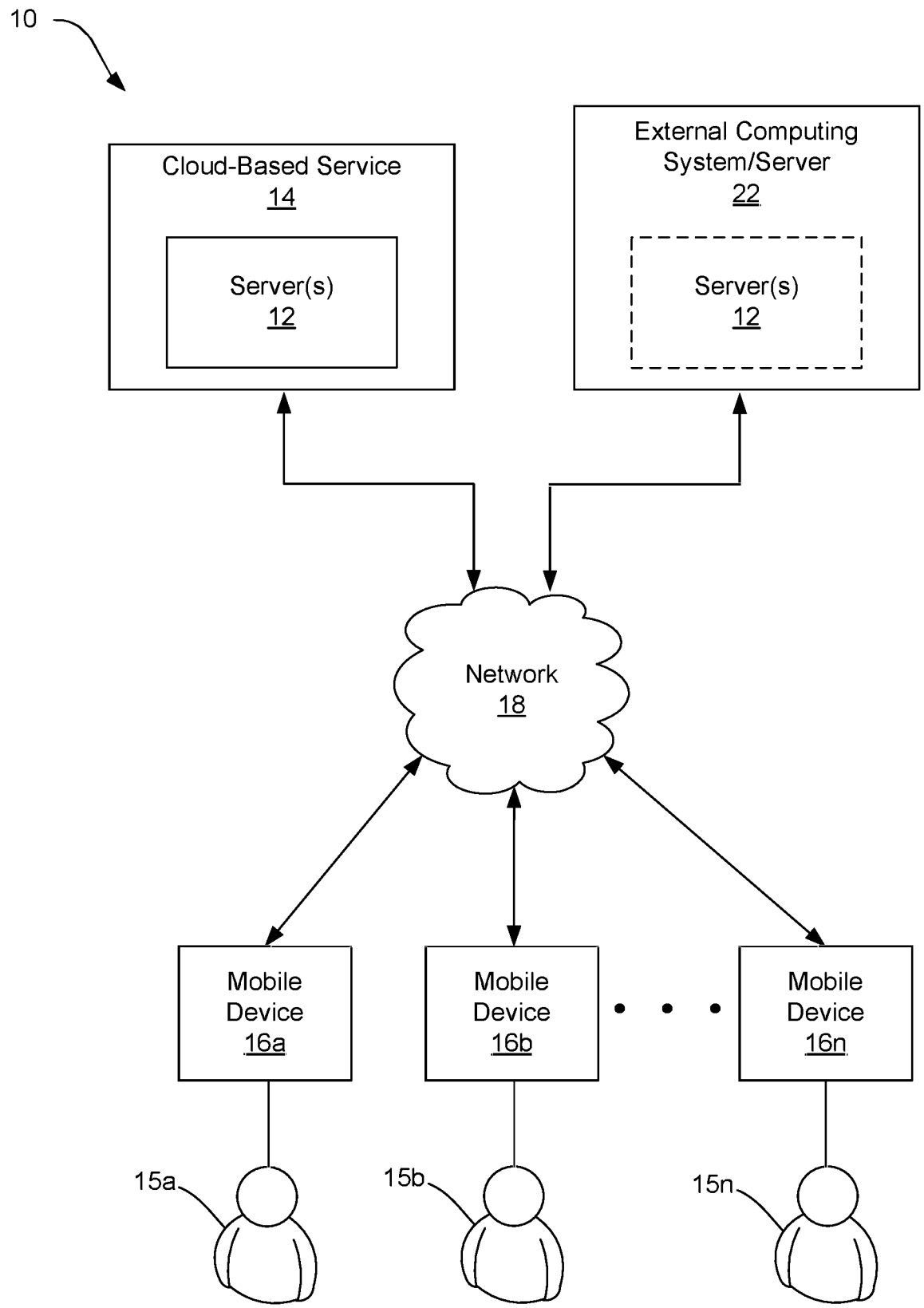
FIG. 1 is a block diagram illustrating one embodiment of an exemplary system for providing cross-device native functionality for a native app.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present invention provides systems and methods for providing cross-device native functionality for a native app. More specifically, the invention is directed to a JavaScript Object Notation (JSON) data exchange format for use with a native app running on a user's mobile device, wherein the exchange format is configured to improve user experience and interaction with the app.

The following description includes exemplary embodiments of the present invention implemented in a mobile-based crowdsourcing platform. As described in greater detail herein, the JSON data exchange format in a native app may be particularly useful in a mobile-based crowdsourcing platform in which data is continually exchanged between remote user devices and a cloud-based service for collecting and managing user-driven data based on user interaction with native apps on their devices. It should be noted, however, that the present invention is not limited to use in a crowdsourcing platform scenario, and may be implemented in mobile applications (apps) in general and not directed to crowdsourcing. For example, the JSON data exchange format may be implemented in a native app directed to providing surveys to a user, or to provide a user with a view and/or control over sensor data in a building, or generating a module available upon demand for entering the cost of a particular work order on the fly. The uses of the JSON data exchange format of the present invention are limitless.

The present invention generally provides a system including a plurality of remote mobile devices configured to communicate and exchange data with a cloud-based service, such as a crowdsourcing platform. Each of the plurality of mobile devices is generally running an abstracted native app for allowing a user to interact and share data with the cloud-based service. The abstracted native app generally includes an app shell, native basic UI elements, and a JSON Translator embedded within the app configured to dynamically and, in real time (when connected to the cloud-based service), translate objects received from the cloud-based service to native UI elements. Accordingly, the JSON Translator acts as a translation layer allowing the dynamic interpretation of data (e.g., app updates) received from cloud-based service into native UI elements compatible with the native app running on the device. Thus, the data exchange format of the present invention allows streaming of UI changes, in contrast to requiring a developer to specifically write the language into a compatible format in each instance of an update. The cloud-based service includes components configured to allow the distribution of the objects to the mobile devices and further allows administrators to make changes or modifications to the app. The system allows an authorized user, such as an administrator, customer, or client providing service) to make changes or modifications to an app in a mobile device's native form on the fly without requiring a re-download or an update of the app.

Accordingly, the present invention provides numerous advantages over current systems. In particular, the novel data exchange format allows for the control of user experience and the UI elements without forcing app updates, essentially allowing an administrator or app owner/developer to control what the user can and cannot do on the app. Furthermore, the mobile app is in native form, which provides optimal user experience. The present invention further simplifies the development process for light weight native apps, which will significantly reduce time for entry to market. The present invention further improves host of capabilities, such as automated workflow and automated UI interaction, as well as potentially expanding the localization capabilities.

FIG. 1 illustrates one embodiment of an exemplary system 10 consistent with the present disclosure. As shown, the system 10 includes a server 12 embodied on an internet-based computing system/service. For example, as shown, the server 12 may be embodied on a cloud-based service 14, for example. The server 12 is configured to communicate and share data with one or more users 15(1)-15(n) via user mobile devices 16(a)-16(n) over a network 18. In the present context, the users 15(1)-15(n) may include administrators, customers, developers, or clients of a service provided to one or more members of the public via the server 12. The users 15(1)-15(n) may also include particular persons to which the service is directed.

For example, the server 12 may host a crowdsourcing platform for receiving user-driven data related to a particular environment in which users may be located, or otherwise reside, wherein such data may be useful to an owner of the space. In one example, the crowdsourcing platform may be useful in building maintenance, wherein the server is configured to collect data from patrons or employees within a space, such as an office space, wherein such data may be related to comfort issues such as HVAC (e.g., temperature of a particular room within a building), building maintenance issues (e.g., lighting issues, cleanliness of facilities, etc.), as well as other aspects of a building or space that may be useful in management of such space. Accordingly, the system of the present invention may include the crowdsourcing platform as described in co-pending and co-owned U.S. patent application Ser. No. 14/328,492, filed Jul. 10, 2014, the content of which is incorporated by reference herein in its entirety.

The system 10 may further include an external computing system/server 22 configured to communicate with at least the cloud-based service 14, and subsequently the server 12, via the network 18. The external computing system/server 20 may be embodied as a remote server, for example, for communicating with the server 12 and for performing the other functions described herein. Similarly, in some embodiments, the server 12 may be embodied on the external computing system/server 22. In the embodiments described herein, the external computing system/server 20 may be embodied as a remote server having one or more databases associated with the server 12, as will be described in greater detail herein.

The network 18 may represent, for example, a private or non-private local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the mobile devices 16, between the mobile devices 16 and the cloud-based service 14 and/or the external computing device/system/server 22, may be, in whole or in part, a wired connection.

The network 18 may be any network that carries data. Non-limiting examples of suitable networks that may be used as network 18 include Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G) cellular-based data communication technologies, Bluetooth radio, Near Field Communication (NFC), the most recently published versions of IEEE 802.11 transmission protocol standards as of June 2015, other networks capable of carrying data, and combinations thereof. In some embodiments, network 18 is chosen from the internet, at least one wireless network, at least one cellular telephone network, and combinations thereof. As such, the network 18 may include any number of additional devices, such as additional computers, routers, and switches, to facilitate communications. In some embodiments, the network 18 may be or include a single network, and in other embodiments the network 18 may be or include a collection of networks.

As shown, in an aspect of the present invention, data and other information and services are, for example, input by one or more users 15 (shown as users 15a-15n) and received by one or more associated mobile devices 16 (shown as mobile devices 16a-16n). The mobile devices 16 are configured to be communicatively coupled to the cloud-based service 14 and/or external device, system or server 22 via the network 18. In addition, or alternatively, the mobile devices 16 are configured to be communicatively coupled to one another via the network 18.

The server 12 is configured to communicate and share data with the mobile devices 16 associated with one or more users 15. Accordingly, the mobile device 16 may be embodied as any type of device for communicating with the server 12 and cloud-based service 14, and/or other user devices over the network 18. For example, at least one of the user devices may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a distributed computing system, a multiprocessor system, a processor-based system, and/or any other computing device configured to store and access data, and/or to execute software and related applications consistent with the present disclosure.

As will be described in greater detail herein, the server 12 is configured to generally provide a means for certain users (users with authority) to create, modify, or otherwise control distribution of, mobile applications to the mobile devices 16. Accordingly, certain users 15 may access the server 12 for the purposes of altering, modifying, or otherwise controlling output of data from the server 12 to other users 15 who do not have direct access. For example, in the event the user 15 is a client, customer, administrator, or developer associated with the service provided via the server 12, such a user may have access to one or more tools for creating, modifying, or controlling a particular app running on mobile devices 16.

Accordingly, the server 12 is configured to provide an interface with which such authorized users, such as a developer for example, may interact for the purposes of allowing control over the running app. Upon modifying the app, the authorized user may then choose to transmit modifications to the app to mobile devices 16 for subsequent updates of the app.

As described in greater detail herein, the mobile devices 16 may be running an abstracted native app thereon, wherein the app allows a user 15 to interact and share data with the server 12. The abstracted native app generally includes an app shell, native basic UI elements, and a JSON Translator embedded within the app configured to dynamically and, in real time (when connected to the cloud-based service), translate objects received from the server 12 (e.g., modifications from authorized user) into native UI elements. Accordingly, the JSON Translator acts as a translation layer allowing the dynamic interpretation of data (e.g., app updates) received from cloud-based service into native UI elements compatible with the native app running on the device. Thus, the data exchange format of the present invention allows streaming of UI changes, in contrast to requiring a developer to specifically write the language into a compatible format in each instance of an update.

Figure 2:
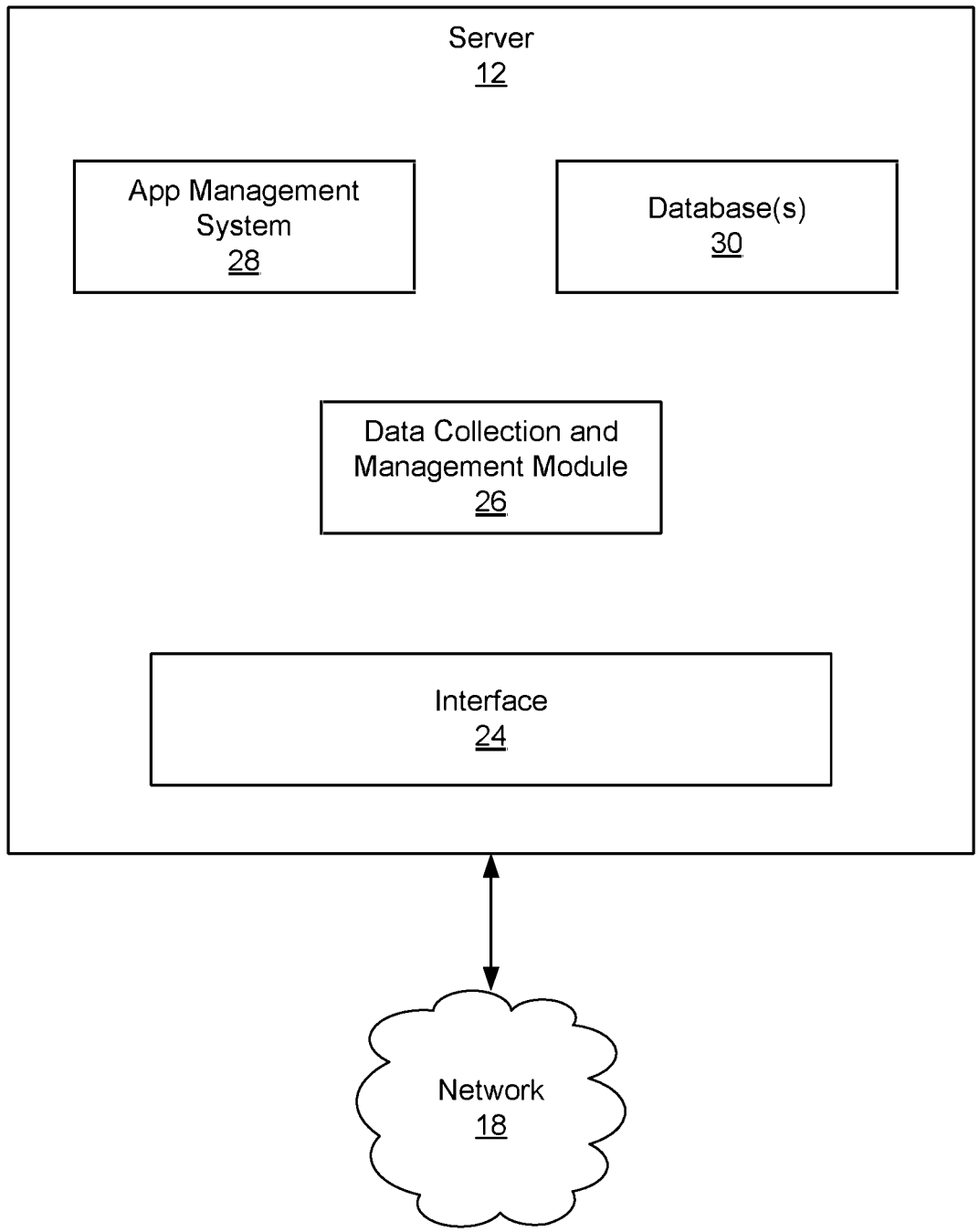
FIG. 2 is a block diagram illustrating the server of FIG. 1 in greater detail.

FIG. 2 is a block diagram illustrating the server 12 in greater detail. As shown, the server 12 may include an interface 24, a data collection and management module 26, an app management system 28, and one or more databases 30 for data related one or more users 15 and input received therefrom. For example, the data collection and management module 26 may be configured to communicate and exchange data with at least the app management system 28 and one or more databases 30, each of which is described in greater detail herein.

As previously described, the interface 24 may generally allow an authorized user 15 to access data on the server. For example, upon accessing the server 12 on the cloud-based service 14, the interface 24 may be presented to the user via their device 16, in which the user may navigate a dashboard or standard platform interface so as to access data (stored in the databases 30) collected from other users and their associated mobile devices. For example, in the event that the service provided is the crowdsourcing platform, a building owner may access data collected from persons within the building (e.g., data may include comfort levels, maintenance issues, movement or location of one or more persons, etc.), wherein such data may be useful in the maintenance of certain systems in the building (e.g., controlling HVAC, alerting proper maintenance worker of any maintenance issues) as we all other useful information, such as identifying which spaces are occupied versus those spaces which are not occupied, and the like. The interface 24 may further allow an authorized user to access the app management system 28, which is configured to allow a developer or the like to create, modify, or otherwise control output of, the app running on the mobile devices 16 of one or more users. The app generally provides an interface on a user's mobile device 16 with which the user may interact to provide user-driven data to the server 12. Accordingly, the building owner, for example, may access the app management system 28 and make modifications to the app when desired (e.g., update the app) and then transmit such modifications to mobile devices 16 running the app.

Figure 3:
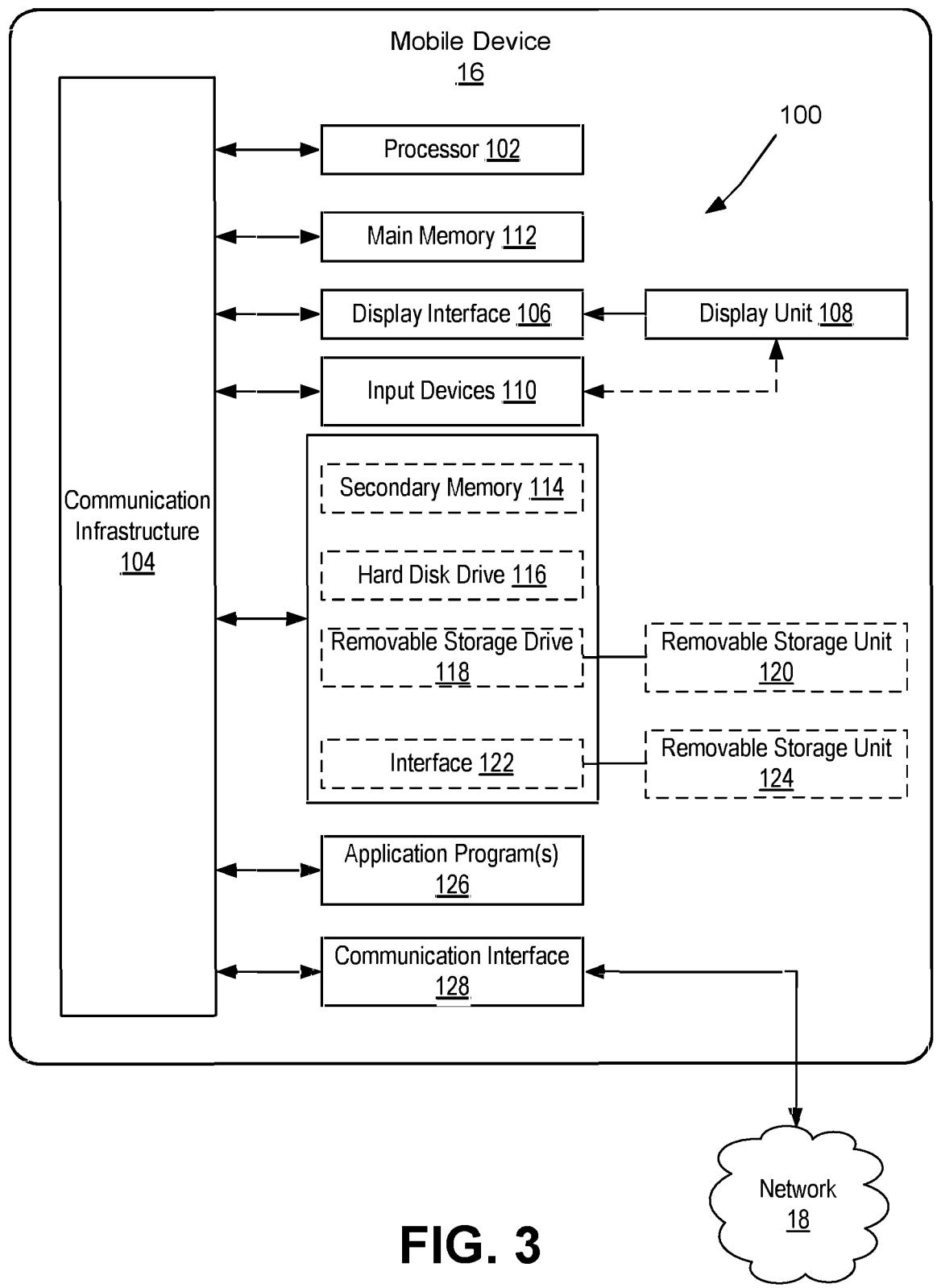
FIG. 3 is a block diagram illustrating at least one embodiment of a mobile device for running a native app consistent with the present disclosure.

FIG. 3 is a block diagram illustrating at least one embodiment of a mobile device 16 for running a native app consistent with the present disclosure. The mobile device 16 generally includes a computing system 100. As shown, the computing system 100 includes one or more processors, such as processor 102. Processor 102 is operably connected to communication infrastructure 104 (e.g., a communications bus, cross-over bar, or network). The processor 102 may be embodied as any type of processor capable of performing the functions described herein. For example, the processor may be embodied as a single or multi-core processor(s), digital signal processor, microcontroller, or other processor or processing/controlling circuit.

The computing system 100 further includes a display interface 106 that forwards graphics, text, sounds, and other data from communication infrastructure 104 (or from a frame buffer not shown) for display on display unit 108. The computing system further includes input devices 110. The input devices 110 may include one or more devices for interacting with the mobile device 16, such as a keypad, microphone, camera, as well as other input components, including motion sensors, and the like. In one embodiment, the display unit 108 may include a touch-sensitive display (also known as "touch screens" or "touchscreens"), in addition to, or as an alternative to, physical push-button keyboard or the like. The touch screen may generally display graphics and text, as well as provides a user interface (e.g., but not limited to graphical user interface (GUI)) through which a user may interact with the mobile device 16, such as accessing and interacting with applications executed on the device 16, including the native app consistent with the present disclosure.

The computing system 100 further includes main memory 112, such as random access memory (RAM), and may also include secondary memory 114. The main memory 112 and secondary memory 114 may be embodied as any type of device or devices configured for short-term or long-term storage of data such as, for example, memory devices and circuits, memory cards, hard disk drives, solid-state drives, or other data storage devices. Similarly, the memory 112, 114 may be embodied as any type of volatile or non-volatile memory or data storage capable of performing the functions described herein.

In the illustrative embodiment, the mobile device 16 may maintain one or more application programs, databases, media and/or other information in the main and/or secondary memory 112, 114. The secondary memory 114 may include, for example, a hard disk drive 116 and/or removable storage drive 118, representing a floppy disk drive, a magnetic tape drive, an optical disk drive, etc. Removable storage drive 118 reads from and/or writes to removable storage unit 120 in any known manner. The removable storage unit 120 may represents a floppy disk, magnetic tape, optical disk, etc. which is read by and written to by removable storage drive 118. As will be appreciated, removable storage unit 120 includes a computer usable storage medium having stored therein computer software and/or data.

In alternative embodiments, the secondary memory 114 may include other similar devices for allowing computer programs or other instructions to be loaded into the computing system 100. Such devices may include, for example, a removable storage unit 124 and interface 122. Examples of such may include a program cartridge and cartridge interface (such as that found in video game devices), a removable memory chip (such as an erasable programmable read only memory (EPROM), or programmable read only memory (PROM)) and associated socket, and other removable storage units 124 and interfaces 122, which allow software and data to be transferred from removable storage unit 124 to the computing system 100.

The computing system 100 further includes one or more application programs 126 directly stored thereon. The application program(s) 126 may include any number of different software application programs, each configured to execute a specific task. For example, as described in greater detail herein, the application program 126 may include an abstracted native app associated with a service (e.g., crowdsourcing platform) allowing a user to interact and share data with the server 12.

The computing system 100 further includes a communications interface 128. The communications interface 128 may be embodied as any communication circuit, device, or collection thereof, capable of enabling communications between the mobile device 16 external devices (other mobile devices 16, the cloud-based service 14, and the external computing system/server 22). The communications interface 128 may be configured to use any one or more communication technology and associated protocols, as described above, to effect such communication. For example, the communications interface 128 may be configured to communicate and exchange data with the server 12, the external computing system/server 22 and/or one other mobile device 16 via a wireless transmission protocol including, but not limited to, Bluetooth communication, infrared communication, near field communication (NFC), radio-frequency identification (RFID) communication, cellular network communication, the most recently published versions of IEEE 802.11 transmission protocol standards as of June 2015, and a combination thereof. Examples of communications interface 228 may include a modem, a network interface (such as an Ethernet card), a communications port, a Personal Computer Memory Card International Association (PCMCIA) slot and card, wireless communication circuitry, etc.

Computer programs (also referred to as computer control logic) may be stored in main memory 112 and/or secondary memory 114 or a local database on the mobile device 16. Computer programs may also be received via communications interface 128. Such computer programs, when executed, enable the computing system 100 to perform the features of the present invention, as discussed herein. In particular, the computer programs, including application programs 126, when executed, enable processor 102 to perform the features of the present invention. Accordingly, such computer programs represent controllers of computer system 100.

In one embodiment where the invention is implemented using software, the software may be stored in a computer program product and loaded into the computing system 100 using removable storage drive 118, hard drive 116 or communications interface 128. The control logic (software), when executed by processor 102, causes processor 102 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 4:
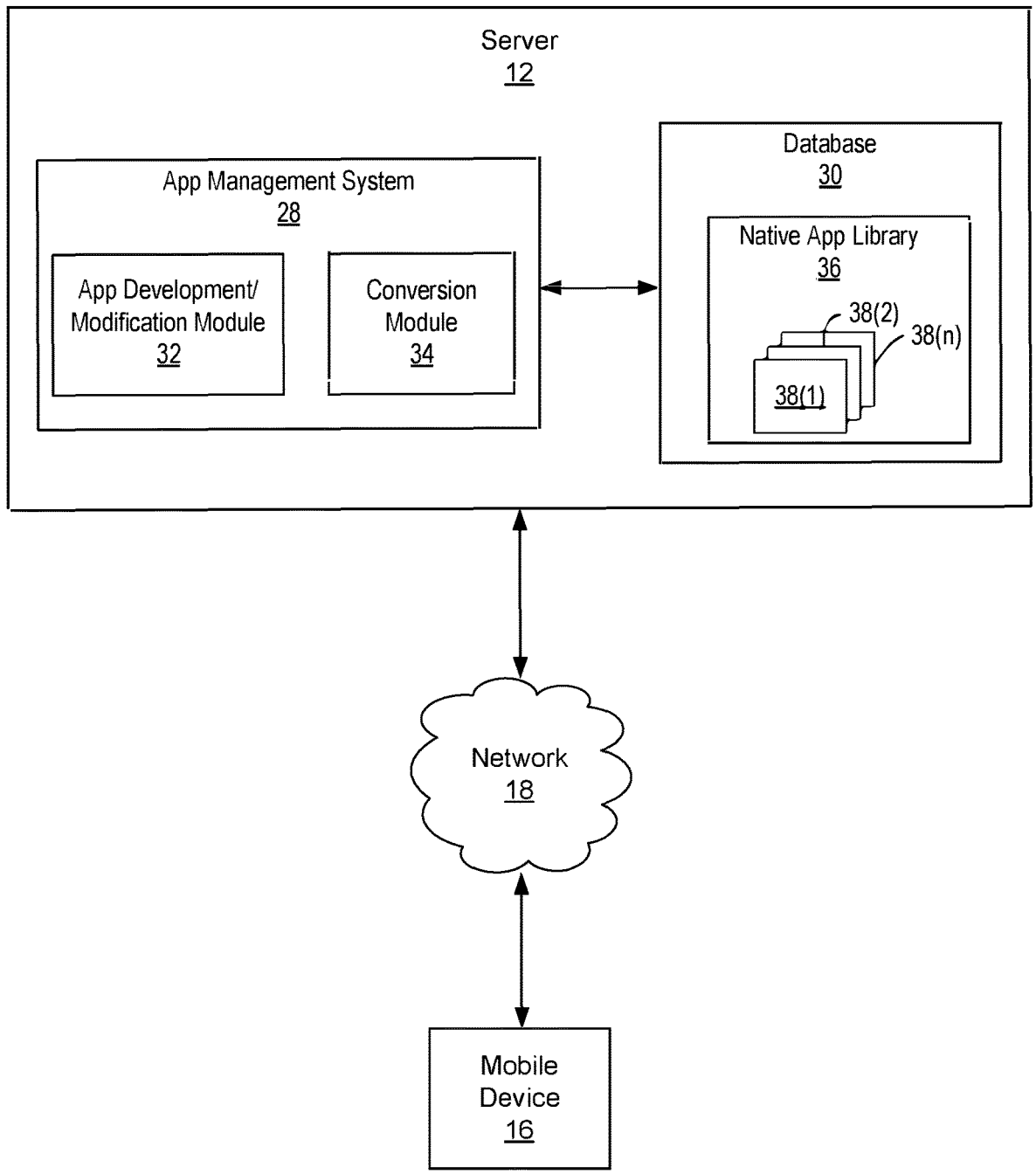
FIG. 4 is a block diagram illustrating the app management system provided by a server in greater detail.

FIG. 4 is a block diagram illustrating the app management system 28 in greater detail. As shown, the app management system 28 may include an app development/modification module 32 and a conversion module 34. For example, a user may wish to alter or update the visual format of a report or other visual rendering displayed to a user via the native app on their device. Accordingly, the user will access to one or more native app profiles 38(1)-38(n) stored in a native app library 36, in which the user may modify any one of the native app profiles 38 and subsequently save a modified native app into a new profile within the library 36. Thus, at any point, a user may retrieve previous versions of a native app and/or create new versions of a native app so as to provide updates.

The app development/modification module 32 is configured to allow a user (e.g., authorized user) to create, modify, or otherwise control aspects of a software application that is either currently provided on one or more mobile devices 16 or will be distributed to one or more mobile devices 16. The app development/modification module 32 may generally provide a software development kit (SDK) or other tools for allowing a user to make any modifications to an app and further transmit such modifications to the mobile devices 16 so as to essentially update the native app running on the mobile device 16, as will be described in greater detail herein. The modifications may be made according to different programming languages, such as JavaScript, HTML, CSS. However, the conversion module 34 is configured to receive modifications from the app development/modification module 32 and further convert such modifications into JSON format by any known techniques. For example, the conversion module 34 may include custom, proprietary, known and/or after-developed data serializing code (or instruction sets) that are generally well-defined and operable to receive programming language of a first type and convert such programming language into a JSON format.

Figure 5:
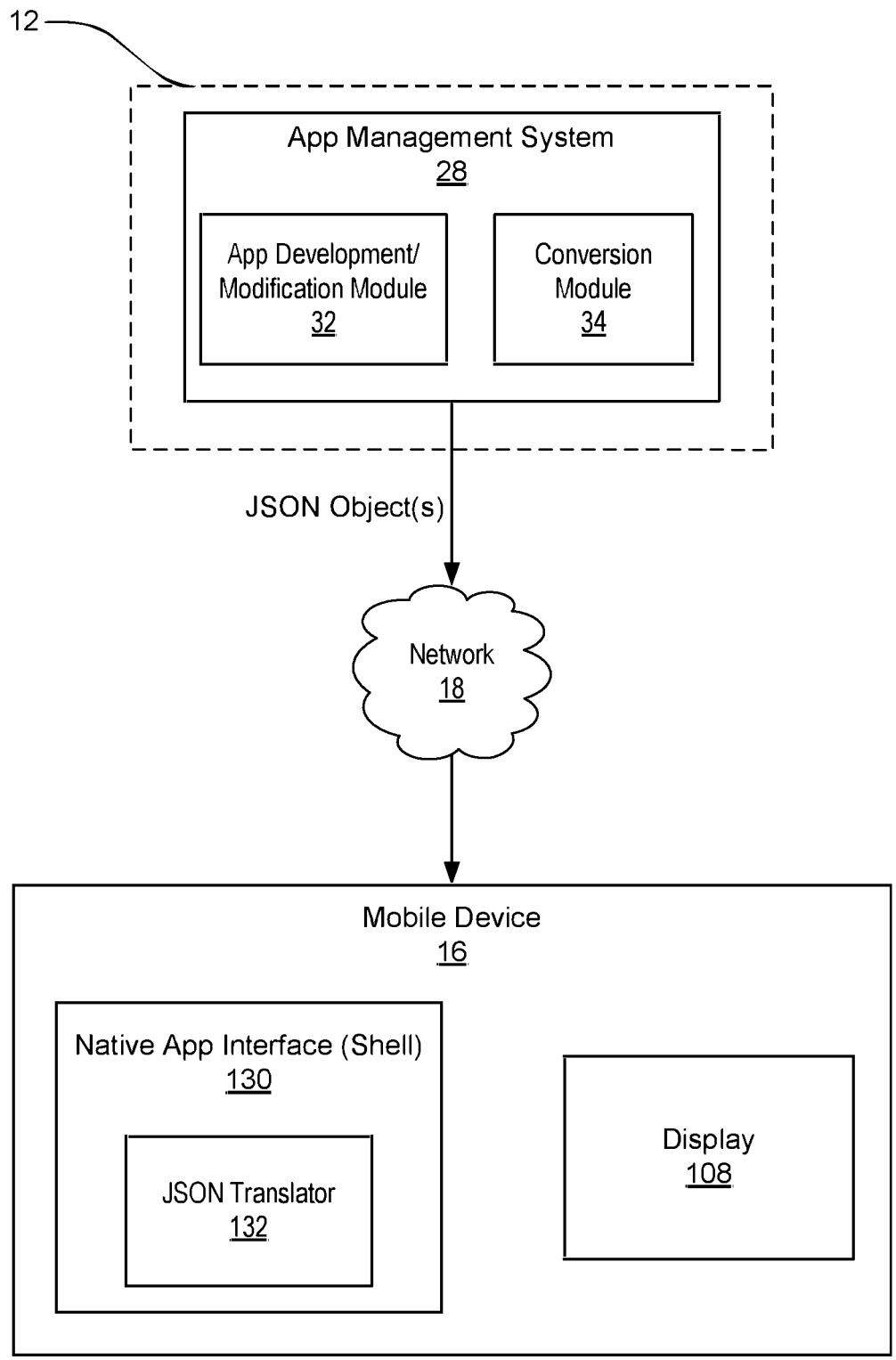
FIG. 5 is a block diagram illustrating streaming of UI changes to a mobile device consistent with the present disclosure.

FIG. 5 is a block diagram illustrating streaming of UI changes from the app management system 28 to a mobile device 16 consistent with the present disclosure. As shown, upon making modifications to an app and subsequent conversion of modification data into JSON objects, the app management system 28 is configured to transmit the JSON objects to a mobile device 16 for subsequent updating of a native app running on the device 16 based on the JSON objects. As previously described, one or more of the mobile devices 16 may be running an abstracted native app for allowing a user 15 to interact and share data with the server 12. As shown, the abstracted native app generally includes a native app interface 130, or app shell. The app shell may generally be understood to be the outermost layer of a program, where shell is another term for user interface. The mobile device 16 further includes a JSON Translator 132 embedded within the app. The JSON translator 132 is configured to dynamically and, in real time (when connected to the server 12), translate objects, namely the JSON objects into native UI elements. Accordingly, the JSON Translator 132 acts as a translation layer allowing the dynamic interpretation of data (e.g., app updates) received from server 12 into native UI elements compatible with the native app running on the device 14 and provided via the display unit 108.

Thus, the data exchange format of the present invention allows streaming of UI changes, in contrast to requiring a developer to specifically write the language into a compatible format in each instance of an update. Furthermore, the system allows for changes or modifications to be made to an app in native form on the fly without requiring a re-download or an update of the app. In addition, the present invention may have applicability to other systems that rely on communication between multiple devices running apps thereon. For example, the ability to create native mobile application in a manner provided by the present invention has tremendous application within Internet of Things (IoT)

echo systems by allowing, not only the users to create content, but also IoT devices to create/modify content as well, which may inform the users in real time in their device's native UI of certain events and information from the IoT devices and improve their ability to interact and act on this content. Further, the present invention provides the ability to still operate based on this content even in an offline mode.

Figure 6A:
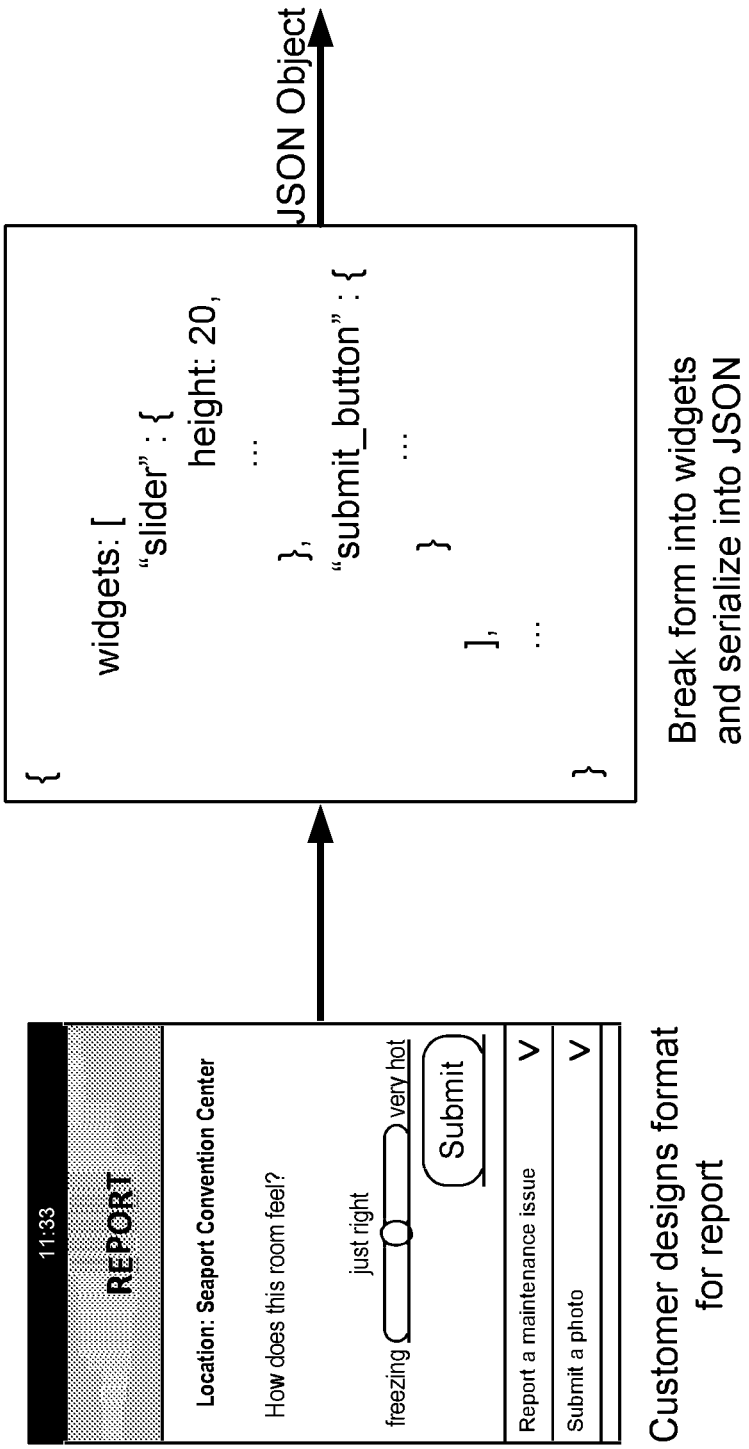
FIGS. 6A-6C illustrate the streaming of app modification data to the mobile device and subsequent dynamic interpretation and translation of app modification by the translation layer of the mobile device into native UI elements for display to a user.
Figure 6B:
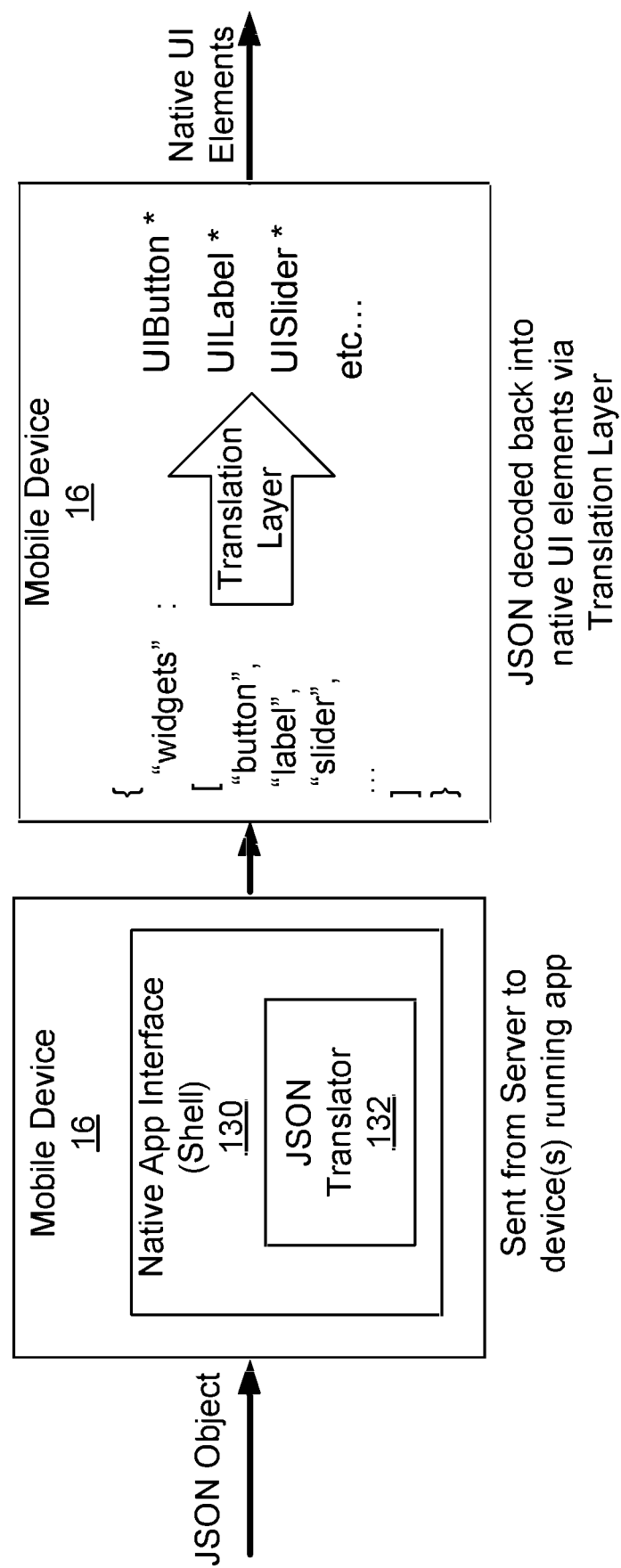
Figure 6C:
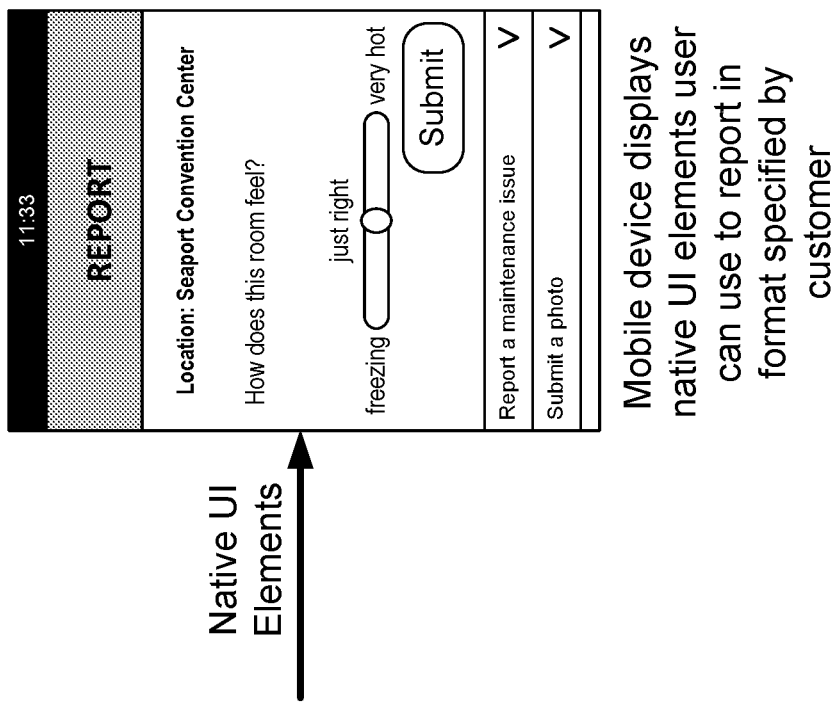

FIGS. 6A-6C illustrate the streaming of app modification data to the mobile device and subsequent dynamic interpretation and translation of app modification by the translation layer of the mobile device into native UI elements for display to a user. As shown in FIG. 6A, a customer (e.g., authorized user) may wish to modify the design (e.g., interface) of a report that will be displayed to a user via a native app running on the user's mobile device. Accordingly, the customer may access the app development/modification module 32 and utilize tools for making such modifications, where they may chance the format design for a report to be displayed to a user. The conversion module 34 is then configured to receive such modifications and convert them into JSON object(s). For example, the conversion module 34 may break the format down into widgets and then serialize into JSON objects. Referring to FIG. 6B, the JSON object(s) may then be transmitted to the mobile device 16 running the native app, at which point, the JSON object(s) are then decoded back into native UI elements via the translation layer (JSON Translator 132) and displayed on the display of the device 14 (FIG. 6C).

Figure 7:
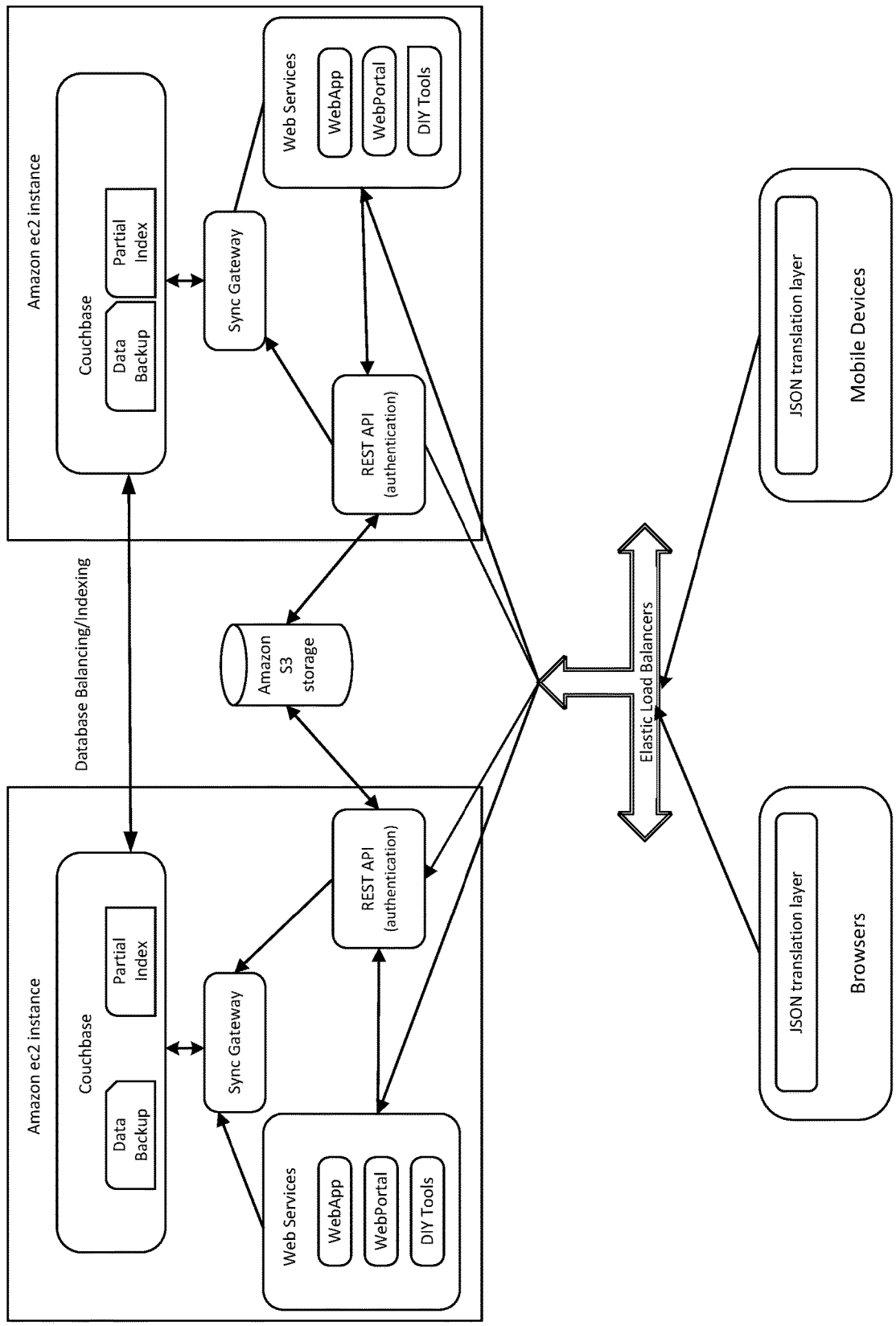
FIG. 7 is a block diagram illustrating one embodiment of system architecture consistent with the present disclosure.

FIG. 7 is a block diagram illustrating one embodiment of a system architecture consistent with the present disclosure. The architecture illustrated in FIG. 7 may provide the same or similar functions as previously described herein, namely the JSON data exchange format for use with a native app running on a user's mobile device, wherein the exchange format is configured to improve user experience and interaction with the app.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:
1. A mobile computing device comprising:
   a wireless communication system for communication with a remote server system; and
   at least one processor coupled to at least one tangible, non-transitory computer-readable medium having embodied therein a native application version of a mobile application, wherein:

the native application version is an abstracted native application designed to run on a predetermined native operating system type in the mobile computing device and comprises an application shell, native basic user interface (UI) elements, and a JSON Translator embedded within the application, wherein the JSON Translator is a translation layer configured to allow dynamic interpretation of JSON data received from the remote server system into native elements compatible with the native application version; and the native application version is further configured to:

receive, from the remote server system via the wireless communication system, modification data associated with an update to the native application version, the modification data including modification data objects configured for translation by the JSON Translator into native elements for the native application version;

dynamically translate, via the JSON Translator, the modification data objects into translated native elements; and update the native application version based on the translated native elements.

2. The mobile computing device of claim 1, wherein the update changes a user interface element to be displayed within the mobile application installed on a mobile device.

3. The mobile computing device of claim 2, wherein the user interface element comprises a report to be displayed to a user of the mobile device.

4. The mobile computing device of claim 1, wherein the update controls what a user of the mobile device can do on the native application version.

5. The mobile computing device of claim 1, wherein the update controls what a user of the mobile device cannot do on the native application version.

6. The mobile computing device of claim 1, wherein the update improves capabilities of the native application version.

7. The mobile computing device of claim 6, wherein the capabilities include automated workflow capabilities.

8. The mobile computing device of claim 6, wherein the capabilities include automated UI interaction.

9. The mobile computing device of claim 6, wherein the capabilities include expanded localization capabilities.

10. The mobile computing device of claim 1, wherein the mobile computing device is selected from the group consisting of a tablet computer, a laptop computer, a notebook computer, a mobile computing device, a smart phone, or a cellular telephone.

11. The mobile computing device of claim 1, wherein the native application version is further configured to wirelessly communicate and exchange data with the crowdsourcing platform over a network via the wireless communication system.

12. The mobile computing device of claim 11, wherein the network is selected from the group consisting of Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G) cellular-based data communication technologies, Bluetooth radio, or Near Field Communication (NFC).

13. The mobile computing device of claim 1, wherein the modification data objects comprise JSON objects converted from initial modification data objects created based on one or more non-JSON format programming languages.

14. The mobile computing device of claim 13, wherein the one or more non-JSON format programming languages are selected from the group consisting of HTML, CSS, and JavaScript.

15. The mobile computing device of claim 1, wherein the JSON Translator dynamically translates the modification data objects into translated native elements in real or near-real time.

16. The mobile computing device of claim 1, wherein the remote server system is part of a crowdsourcing platform, and wherein the native application version of the mobile application allows users to provide user-driven data to the crowdsourcing platform relating to an environment in which the user is located.

17. The mobile computing device of claim 16, wherein the user-driven data is associated with user comfort within a given environment in which the user is located.

18. The mobile computing device of claim 17, wherein the user comfort is associated with temperature within the given environment.

19. The mobile computing device of claim 16, wherein the user-driven data is associated with cleanliness of a given environment in which the user is located.

* * * * *